(12) United States Patent
Ewart et al.

(10) Patent No.: US 9,328,180 B2
(45) Date of Patent: May 3, 2016

(54) FREE-RADICAL PROCESSES TO MAKE ETHYLENE-BASED POLYMERS USING ALKLYATED PHENOLS

(71) Applicant: Dow Global Technologies LLC, Midland, MI (US)

(72) Inventors: Sean W. Ewart, Pearland, TX (US); Teresa P. Karjala, Lake Jackson, TX (US); Michael J. Zogg, Jr., Houston, TX (US); Sarat Munjal, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/404,876

(22) PCT Filed: Mar. 8, 2013

(86) PCT No.: PCT/US2013/029875
§ 371 (c)(1),
(2) Date: Dec. 1, 2014

(87) PCT Pub. No.: WO2013/180784
PCT Pub. Date: Dec. 5, 2013

(65) Prior Publication Data
US 2015/0148504 A1 May 28, 2015

Related U.S. Application Data

(60) Provisional application No. 61/654,141, filed on Jun. 1, 2012.

(51) Int. Cl.
*C08F 2/38* (2006.01)
*C08F 4/00* (2006.01)
(Continued)

(52) U.S. Cl.
CPC .............. *C08F 110/02* (2013.01); *C08F 2/38* (2013.01)

(58) Field of Classification Search
CPC .......... C08F 110/02; C08F 10/02; C08F 2/38; C08F 4/34; C08F 4/52; C08F 4/12; C08F 2500/26; C08F 2500/08; C08F 2500/03; C08F 2500/10; C08F 2500/12

USPC .............. 526/184, 352, 348, 90, 84, 227
See application file for complete search history.

(56) References Cited

U.S. PATENT DOCUMENTS 3,198,780 A 8/1965 Monsanto Co.
5,539,075 A 7/1996 Gustafsson et al.
(Continued)

FOREIGN PATENT DOCUMENTS

EP 1650236 A1 4/2006
EP 2256158 A1 12/2010
(Continued)

OTHER PUBLICATIONS

J. Schellenberg, J. Macromol. Rapid Commun. 2005, 26, 1299-1303.
(Continued)

*Primary Examiner* — William Cheung

(57) ABSTRACT

The invention provides a process to form an ethylene-based polymer, said process comprising polymerizing ethylene in presence of at least the following: A) a free-radical agent; B) an alkylated phenol selected from Formula (I), wherein $R_1$, $R_2$, $R_3$, $R_4$ and $R_5$ are each, independently, hydrogen or an alkyl; and C) a "metal alkyl-containing compound" selected from the group consisting of the following: i) at least one "Group II metal alkyl-containing compound," ii) at least one "Group III metal alkyl-containing compound," and iii) a combination of i) and ii).

(I)

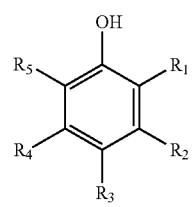

16 Claims, 2 Drawing Sheets

(51) Int. Cl.
   *C08F 4/44* (2006.01)
   *C08F 4/28* (2006.01)
   *C08F 210/00* (2006.01)
   *C08F 110/02* (2006.01)

(56) References Cited

U.S. PATENT DOCUMENTS

| | | | |
|---|---|---|---|
| 5,973,087 | A | 10/1999 | Luft et al. |
| 6,521,734 | B1 | 2/2003 | Araki et al. |
| 7,767,613 | B2 | 8/2010 | Mihan |
| 9,045,628 | B2 * | 6/2015 | Ewart .................. C08L 23/06 |
| 2010/0108357 | A1 | 5/2010 | Smedberg et al. |
| 2011/0196105 | A1 | 8/2011 | Eddy et al. |

FOREIGN PATENT DOCUMENTS

| | | | |
|---|---|---|---|
| EP | 2256159 | A1 | 12/2010 |
| GB | 1205635 | * | 9/1970 |
| WO | 97/45465 | A1 | 12/1997 |
| WO | 2010042390 | A1 | 4/2010 |
| WO | 2011019563 | A1 | 2/2011 |

OTHER PUBLICATIONS

Turunen et al., Journal of Applied Polymer Science, vol. 100, 4632-4635 (2006).
Busico et al., J. Am. Chem. Soc. 2003, 125, 12402-12403.
Carlini et. al., Macromol. Rapid Commun. 2005, 26, 808-812.
Huff et al., Reaction of Polymeric Radicals with Organoaluminum Compounds, Journal of Polymer Science: Part A, 1963, 1, 1553-1572.
Huff et al., The Reaction of Styryl Radicals with Organoaluminum Compounds, J. Am. Chem. Soc., 1960, 82, 4277-4281.
Grotewold et al., Triethylaluminum as a Concentrate-Dependent Coinitiator and Chain-Transfer Agent of Free-Radical Polymerization of Methyl Methacrylate in the Presence of Benzoquinone, Journal of Polymer Science: Polymer Chemistry Edition, 1977, 15, 393-404.
Milovskaya et al., Synthesis and Characteristics of Polystyryl Aluminum Derivatives and Their Reaction with Benzoyl Peroxide, Polymer, 1982, 23, 891-896.
Götz et al., Influence of Aluminum Alkyl Compounds on the High-Pressure Polymerization of Ethylene with Ternary Metallocene-Based Catalysts. Investigation of Chain Transfer to Aluminum, Macromol. Mater. Eng., 2002, 287, 16-22.
Gridnev et al., Catalytic Chain Transfer in Free-Radical Polymerizations, Chem. Rev., 2001, 101, 3611-3659.
Mortimer, Chain Transfer in Ethylene Polymerization. VII. Very Reactive and Depletable Transfer Agents, Journal of Polymer Science: Part A-1, 1972, 10, 163-168.
PCT/ US2013/029875, International Search Report abd Written Opinion, mailed May 7, 2013.
PCT/US2013/029875, International Preliminary Report on Patentability, mailed Dec. 11, 2014.

* cited by examiner

FREE-RADICAL PROCESSES TO MAKE ETHYLENE-BASED POLYMERS USING ALKLYATED PHENOLS

REFERENCE TO RELATED APPLICATIONS

This application is a 371 National Phase filing of International PCT Patent Application No. PCT/US2013/029875, filed Mar. 8, 2013, which claims the benefit of U.S. Provisional Application No. 61/654,141, filed Jun. 1, 2012 and is incorporated herein by reference.

BACKGROUND

It has been previously demonstrated that the addition of alkyl aluminum species, including aluminoxanes, to a high pressure, free radical polyethylene reaction can be beneficial in terms of molecular catalyst activation, and as a scavenger for polar species. It has also been shown that alkyl aluminum species, in a high pressure polyethylene reactor, cause catalytic chain transfer, reducing the polyethylene molecular weight (raising the melt index). This can be advantageous for the production of certain products, but can also be disadvantageous in certain applications, such as films, since the production of low molecular weight (MW) polymer may impair the film properties. More recently, it has been discovered that, at elevated temperatures and concentrations, these alkyl aluminum species can break apart to form free radicals, leading to runaway reactions, again an undesirable effect. Alkyl aluminums have been used in the high pressure polyethylene reactors at low temperatures or concentrations to avoid the instability or chain transfer effects.

Thus, there is a need for new free-radical polymerizations for the production of ethylene-based polymers that reduce, or eliminate, both the chain transfer effect and the instability of the alkyl aluminum at high temperatures, without hindering the ability of the alkyl aluminum to scavenge polar impurities or activate molecular catalysts.

J. Schellenberg, *J. Macromol. Rapid Commun.* 2005, 26, 1299-1303, discloses a solvent-free, syndiospecific, coordination polymerization of styrene, in the presence of MAO, TIBA, and the reaction products of sterically hindered phenolic compounds. The presence of such reaction products was disclosed as increasing the polymerization activity of the catalyst system, and improving the thermal stability of the polymers produced.

Turunen et al., *Journal of Applied Polymer Science*, Vol. 100, 4632-4635 (2006), discloses the use of a sterically hindered phenol to reduce the catalyst leaching of zirconocene dichloride ($Cp_2ZrCl_2$) from a silica support during an ethylene polymerization. Busico et al., *J. Am. Chem. Soc.* 2003, 125, 12402-12403 discloses the controlled addition of a sterically hindered phenol to MAO solutions, as a way to trap "free" trimethylaluminum (TMA).

Carlini et Al., *Macromol. Rapid Commun.* 2005, 26, 808-812, discloses the use of 2,6-di-tert-butylphenol in an ethylene polymerization, catalyzed by a bis(salicylaldiminate)-nickel(II)-based catalyst, to reduce the content of free trimethylaluminum. European Patent Application EP1650236A1 discloses a metallocene catalyst system, prepared with a hafnium-based metallocene catalyst and an activating agent comprising an aluminoxane and a sterically hindered Lewis base.

Additional polymerization processes and/or polymer products are disclosed in the following references: Huff et al., *Reaction of Polymeric Radicals with Organoaluminum Compounds*, Journal of Polymer Science: Part A, 1963, 1, 1553-1572; Huff et al., *The Reaction of Styryl Radicals with Organoaluminum Compounds*, J. Am. Chem. Soc., 1960, 82, 4277-4281; Grotewold et al., *Triethylaluminum as a Concentrate-Dependent Coinitiator and Chain-Transfer Agent of Free-Radical Polymerization of Methyl Methacrylate in the Presence of Benzoquinone*, Journal of Polymer Science: Polymer Chemistry Edition, 1977, 15, 393-404; Milovskaya et al., *Synthesis and Characteristics of Polystyryl Aluminum Derivatives and Their Reaction with Benzoyl Peroxide*, Polymer, 1982, 23, 891-896; Götz et al., *Influence of Aluminum Alkyl Compounds on the High-Pressure Polymerization of Ethylene with Ternary Metallocene-Based Catalysts. Investigation of Chain Transfer to Aluminum*, Macromol. Mater. Eng., 2002, 287, 16-22; Gridnev et al., *Catalytic Chain Transfer in Free-Radical Polymerizations*, Chem. Rev., 2001, 101, 3611-3659; Mortimer, *Chain Transfer in Ethylene Polymerization. VII. Very Reactive and Depletable Transfer Agents*, Journal of Polymer Science: Part A-1, 1972, 10, 163-168; International Publication Nos. WO 2010/042390, 2011/019563, 1997/45465; European Application Nos. EP 2256158A1, EP2256159A1; U.S. application Ser. No. 12/701,859; U.S. Pat. Nos. 7,767,613; 6,521,734; 5,539,075; U.S. Publication 2010/0108357;

However, the polymerizations discussed above are directed to coordination polymerizations, catalyzed by metallocene and other coordination-type catalysts, and typically run at low pressures and low temperatures. These low pressure polymerization processes do not have the same issues of catalytic chain transfer and free radical runaway reactions associated with free-radical polymerizations. As discussed above, there is a need for new free-radical polymerizations to form ethylene-based polymers, such as low density polyethylene (LDPE), that can be run in the presence of an alkyl aluminum compound, for the activating and scavenging benefits of the alkyl aluminum compound, and which also reduce, or eliminate, the chain-transfer effects and instability of the alkyl aluminum compound, especially at higher polymerization temperatures. These needs have been met by the following invention.

SUMMARY OF INVENTION

The invention provides a process to form an ethylene-based polymer, said process comprising polymerizing ethylene in presence of at least the following:

A) a free-radical agent;
B) an alkylated phenol selected from Formula I:

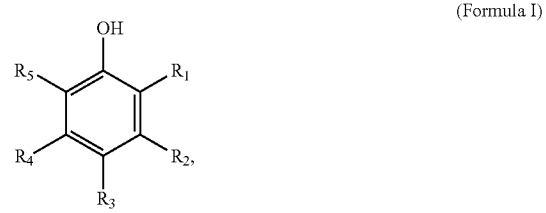

(Formula I)

wherein R1, R2, R3, R4 and R5 are each, independently, hydrogen or an alkyl; and C) a "metal alkyl-containing compound" selected from the group consisting of the following:
 i) at least one "Group II metal alkyl-containing compound,"
 ii) at least one "Group II metal alkyl-containing compound," and
 iii) a combination of i) and ii).

DETAILED DESCRIPTION

Figure 1:
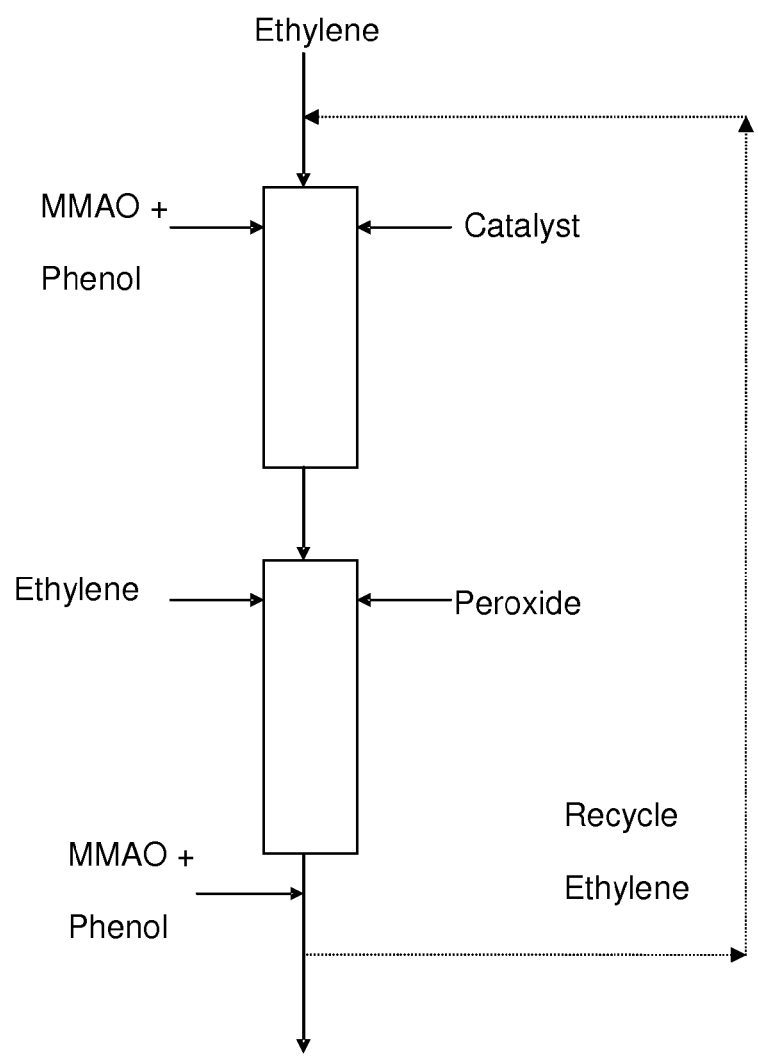
FIG. 1 depicts a schematic of a free-radical polymerization using two reactors, and showing the addition locations of the ethylene, phenol, metal alkyl-containing compound, coordination catalyst, and peroxide, and a recycle ethylene path.

It has been discovered that the addition of an alkylated phenol, such as 2,6-di-tert-butyl-4-methylphenol (BHT), to a free-radical polymerization, run in the presence of a metal alkyl-containing compound, reduces, or eliminates, both the chain transfer effect and the instability of the metal alkyl-containing compound, at high temperatures, without hindering the ability of the metal alkyl-containing compound to scavenge polar impurities or activate molecular catalysts. It has also been discovered that the addition of an alkylated phenol allows the use of the metal alkyl-containing compounds at high polymerization temperatures and at high ethylene pressures.

As discussed above, the invention provides a process to form an ethylene-based polymer, said process comprising polymerizing ethylene in the presence of at least the following:

A) a free-radical agent;
B) an alkylated phenol selected from Formula I:

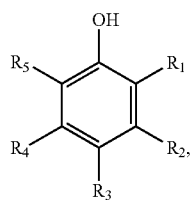

(Formula I)

wherein R1, R2, R3, R4 and R5 are each, independently, hydrogen or an alkyl; and C) a "metal alkyl-containing compound" selected from the group consisting of the following:
 i) at least one "Group II metal alkyl-containing compound,"
 ii) at least one "Group II metal alkyl-containing compound," and
 iii) a combination of i) and ii).

An inventive process may comprise a combination of two or more embodiments described herein.

In one embodiment, the polymerization takes place at a polymerization pressure of at least 14,000 psi.

In one embodiment, the polymerization pressure is greater than, or equal to, 16,000 (110 MPa) psi, or greater than, or equal to, 20,000 psi (138 MPa).

In one embodiment, the polymerization pressure is from 16,000 psi (110 MPa) to 60,000 psi (413 MPa).

In one embodiment, the polymerization pressure is from 16,000 psi (110 MPa) to 40,000 psi (276 MPa).

In one embodiment, the polymerization temperature is from 140° C. to 350° C.

In one embodiment, the polymerization temperature is from 160° C. to 325° C.

In one embodiment, the polymerization temperature is from 180° C. to 300° C.

In one embodiment, the polymerization temperature is greater than, or equal to, 180° C.

In one embodiment, the free-radical agent is a peroxide.

In one embodiment, the polymerization takes place in at least one reactor. In a further embodiment, the reactor is a tubular reactor. In another embodiment, the reactor is an autoclave reactor.

In one embodiment, the polymerization takes place in a combination of at least one tubular reactor and at least one autoclave reactor.

An inventive process may comprise a combination of two or more embodiments as described herein.

The invention also provides an ethylene-based polymer formed by an inventive process. In a further embodiment, the ethylene-based polymer is a LDPE homopolymer.

In one embodiment, the ethylene-based polymer has a Mw(conv)/Mn(conv) from 2 to 20. In a further embodiment, the ethylene-based polymer is a LDPE homopolymer.

In one embodiment, the ethylene-based polymer has a Mw(conv)/Mn(conv) from 3 to 10. In a further embodiment, the ethylene-based polymer is a LDPE homopolymer.

In one embodiment, the ethylene-based polymer has a Mw(conv)/Mn(conv) from 3.0 to 7.0, further from 3.2 to 6.8, further from 3.4 to 6.6. In a further embodiment, the ethylene-based polymer is a LDPE homopolymer.

In one embodiment, the ethylene-based polymer has a density from 0.900 to 0.970 g/cc. In a further embodiment, the ethylene-based polymer is a LDPE homopolymer.

In one embodiment, the ethylene-based polymer has a density from 0.915 to 0.940 g/cc. In a further embodiment, the ethylene-based polymer is a LDPE homopolymer.

In one embodiment, the ethylene-based polymer has a melt index (I2) from 0.05 to 100 g/10 min. In a further embodiment, the ethylene-based polymer is a LDPE homopolymer.

In one embodiment, the ethylene-based polymer has a melt index (I2) from 0.15 to 50 g/10 min. In a further embodiment, the ethylene-based polymer is a LDPE homopolymer.

In one embodiment, the ethylene-based polymer has a melt index (I2) from 0.2 to 70 g/10 min. In a further embodiment, the ethylene-based polymer is a LDPE homopolymer.

In one embodiment, the ethylene-based polymer has a melt index (I2) from 1 to 30 g/10 min. In a further embodiment, the ethylene-based polymer is a LDPE homopolymer.

In one embodiment, the ethylene-based polymer has ≥0.1 amyl (C5) branches per 1000 carbon atoms, as determined by 1H NMR. In a further embodiment, the ethylene-based polymer is a LDPE homopolymer.

In one embodiment, the ethylene-based polymer has ≥0.3 amyl branches per 1000 carbon atoms, as determined by 1H NMR. In a further embodiment, the ethylene-based polymer is a LDPE homopolymer.

In one embodiment, the ethylene-based polymer has ≥0.5 amyl branches per 1000 carbon atoms, as determined by 1H NMR. In a further embodiment, the ethylene-based polymer is a LDPE homopolymer.

In one embodiment, the ethylene-based polymer does not comprise a polymerized diene.

In one embodiment, the ethylene-based polymer is a LDPE homopolymer.

An inventive ethylene-based polymer may comprise a combination of two or more embodiments as described herein.

An inventive LDPE homopolymer may comprise a combination of two or more embodiments as described herein.

The invention also provides a process for producing an ethylene-based polymer composition, said process comprising at least the following steps:

1) polymerizing ethylene in the presence of at least one molecular catalyst, a hydrocarbon chain transfer agent, and a "metal alkyl-containing compound" selected from the group consisting of the following:
   i) at least one "Group II metal alkyl-containing compound,"
   ii) at least one "Group II metal alkyl-containing compound," or
   iii) a combination of i) and ii),
and at a polymerization pressure of at least 14,000 psi, to form a first ethylene-based polymer, and
2) polymerizing a second ethylene-based polymer according to the process of any of the above process embodiments and corresponding embodiments described herein.

In one embodiment, the first ethylene-based polymer is polymerized in the presence of a compound selected from Formula I, as described herein.

In one embodiment, the second ethylene-based polymer is a LDPE homopolymer.

An inventive process may comprise a combination of two or more embodiments as described herein.

The invention also provides a composition comprising the ethylene-based polymer formed by an inventive process described herein. In a further embodiment, the composition comprises one or more additives. In one embodiment, the ethylene-based polymer is a LDPE homopolymer.

The invention also provides a composition comprising the ethylene based polymer composition formed by an inventive process described herein. In a further embodiment, the composition comprises one or more additives. In one embodiment, the second ethylene-based polymer is a LDPE homopolymer.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.890 to 0.960 g/cc, or from 0.900 to 0.940 g/cc (1 cc=1 cm$^3$). In a further embodiment, the composition comprises from 10 to 50 weight percent, or from 20 to 40 weight percent, of the inventive ethylene-based polymer, based on the weight of the composition. In another embodiment, the composition comprises from 10 to 50 weight percent, or from 20 to 40 weight percent, of the inventive first and second ethylene-based polymers, based on the weight of the composition.

In one embodiment, the inventive ethylene-based polymer is present in an amount greater than, or equal to, 10 weight percent, based on the weight of the composition.

In one embodiment, the inventive ethylene-based polymer is present in an amount from 10 to 50 weight percent, further from 15 to 40 weight percent, based on the weight of the composition.

In one embodiment, the inventive first and second ethylene-based polymers are present, in sum, in an amount greater than, or equal to, 10 weight percent, based on the weight of the composition.

In one embodiment, the first and second ethylene-based polymers are present, in sum, in an amount from 10 to 50 weight percent, further from 15 to 40 weight percent, based on the weight of the composition.

In one embodiment, an inventive composition comprises another ethylene-based polymer. Suitable other ethylene-based polymers include, but are not limited to, DOWLEX Polyethylene Resins, TUFLIN Linear low Density Polyethylene Resins, ELITE Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and ethylene vinyl acetate (EVA).

In one embodiment, an inventive composition further comprises another ethylene-based polymer that differs in one or more properties, such as density, melt index, comonomer, comonomer content, etc., from an inventive ethylene-based polymer. Suitable other ethylene-based polymers include, but are not limited to, DOWLEX Polyethylene Resins, TUFLIN Linear low Density Polyethylene Resins, ELITE Enhanced Polyethylene Resins (all available from The Dow Chemical Company), high density polyethylenes (d≥0.96 g/cc), medium density polyethylenes (density from 0.935 to 0.955 g/cc), EXCEED polymers and ENABLE polymers (both from ExxonMobil), LDPE, and ethylene vinyl acetate (EVA).

In one embodiment, an inventive composition further comprises another ethylene-based polymer that differs in one or more properties, such as density, melt index, comonomer, comonomer content, etc., from the first or second ethylene-based polymer of the ethylene-based polymer composition. Suitable other ethylene-based polymers include, but are not limited to, DOWLEX Polyethylene Resins, TUFLIN Linear low Density Polyethylene Resins, ELITE Enhanced Polyethylene Resins (all available from The Dow Chemical Company), high density polyethylenes (d≥0.96 g/cc), medium density polyethylenes (density from 0.935 to 0.960 g/cc), EXCEED polymers and ENABLE polymers (both from ExxonMobil), LDPE, and ethylene vinyl acetate (EVA).

In one embodiment, an inventive composition further comprises a propylene-based polymer. Suitable propylene-based polymers include polypropylene homopolymers, propylene/α-olefin interpolymers, and propylene/ethylene interpolymers.

An inventive composition may comprise any one of the embodiments described herein.

An inventive composition may comprise a combination of two or more embodiments as described herein.

An inventive ethylene-based polymer may comprise a combination of two or more embodiments as described herein.

The invention also provides an article comprising at least one component formed from an inventive composition. In a further embodiment, the article is a film.

An inventive article may comprise any one of the embodiments as described herein.

An inventive article may comprise two or more embodiments as described herein.

Alkylated Phenols

An alkylated phenol is selected from compounds of Formula I, as shown below:

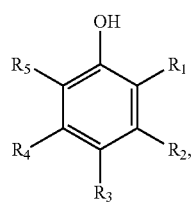

(Formula I)

wherein R1, R2, R3, R4 and R5 are each, independently, hydrogen or an alkyl.

An alkylated phenol may comprise a combination of two or more embodiments as described herein.

In one embodiment, for Formula I, R1, R2, R3, R4 and R5 are each, independently, hydrogen; or a C1-C20 alkyl, further a C1-C10 alkyl, and further a C1-C5 alkyl.

In one embodiment, for Formula I, R1, R2, R3, R4 and R5 are each, independently, a C1-C20 alkyl, and further a C1-C10 alkyl, and further a C1-C5 alkyl.

In one embodiment, for Formula I, R1 and R5 are each, independently, a C3-C20 alkyl, and further a C3-C10 alkyl, and further a C3-C5 alkyl; and each of R2, R3 and R4 is, independently, a C1-C20 alkyl, and further a C1-C10 alkyl, and further a C1-C5 alkyl.

In one embodiment, the alkylated phenol is selected from compounds of Formula II, as shown below:

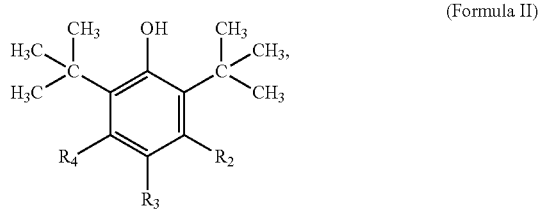

(Formula II)

wherein R2, R3, and R4 are each, independently, hydrogen or an alkyl.

In one embodiment, for Formula II, R2, R3 and R4 are each, independently, hydrogen; or a C1-C20 alkyl, further a C1-C10 alkyl, and further a C1-C5 alkyl.

In one embodiment, for Formula II, R2, R3 and R4 are each, independently, a C1-C20 alkyl, and further a C1-C10 alkyl, and further a C1-C5 alkyl.

In one embodiment, the alkylated phenol is 2,6-di-tert-butyl-4-methylphenol also referred to as BHT and shown below:

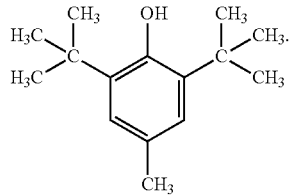

In one embodiment, the alkylated phenol is present, the process, in an amount less than, or equal to, 1000 mole ppm, based on the total moles of ethylene added to the polymerization.

In one embodiment, the alkylated phenol is present, in the process, in an amount from "greater than zero" to less than, or equal to, 1000 mole ppm, based on the total moles of ethylene added to the polymerization.

In one embodiment, the alkylated phenol is present, in the process, in an amount >0 molar ppm, further >1 molar ppm, and further >2 molar ppm, based on the total moles of ethylene added to the polymerization.

In one embodiment, the alkylated phenol is present, in the process, in an amount >1 molar ppm, further >3 molar ppm, and further >5 molar ppm, based on the total moles of ethylene added to the polymerization.

In one embodiment, the alkylated phenol is present, in the process, in an amount ≤900 molar ppm, further ≤500 molar ppm, and further ≤100 molar ppm, based on the total moles of ethylene added to the polymerization.

In one embodiment, the alkylated phenol is present, in the process, in an amount ≤70 molar ppm, further ≤50 molar ppm, and further ≤30 molar ppm, based on the total moles of ethylene added to the polymerization.

In one embodiment, the alkylated phenol is present, in the process, in an amount ≤25 molar ppm, further ≤20 molar ppm, and further ≤15 molar ppm, based on the total moles of ethylene added to the polymerization.

In one embodiment, the alkylated phenol is present, in the process, in an amount from 1 to 1000 molar ppm, based on the total moles of ethylene added to the polymerization.

In one embodiment, the alkylated phenol is present, in the process, in an amount from 2 to 500 molar ppm, based on the total moles of ethylene added to the polymerization.

In one embodiment, the alkylated phenol is present, in the process, in an amount from 10 to 100 molar ppm, based on the total moles of ethylene added to the polymerization.

In one embodiment, the molar ratio of aklylated phenol to "metal alkyl-containing compound" is from "greater than zero" to 2 molar equivalents of metal added to the reactor. In a further embodiment, the metal is aluminum.

In one embodiment, the molar ratio of aklylated phenol to "metal alkyl-containing compound" is from 1 to 2 molar equivalents of metal added to the reactor. In a further embodiment, the metal is aluminum.

An alkylated phenol may be added to the polymerization process as depicted in the schematic of FIG. 1.

An alkylated phenol may comprise a combination of two or more embodiments as described herein.

Alkyl Metal-Containing Compound

A "metal alkyl-containing compound" is selected from the group consisting of the following:
  i) at least one "Group II metal alkyl-containing compound,"
  ii) at least one "Group III metal alkyl-containing compound," or
  iii) a combination of i) and ii).

As used herein, the term "metal alkyl-containing compound," refers to a compound containing at least one metal-alkyl bond.

As used herein, the term "Group II metal alkyl-containing compound," refers to a compound containing at least one Group II metal alkyl-bond.

As used herein, the term "Group III metal alkyl-containing compound," refers to a compound containing at least one Group III metal alkyl-bond.

In one embodiment, the metal of the "metal alkyl-containing compound" is aluminum.

In one embodiment, the "metal alkyl-containing compound" comprises at least one Al-alkyl bond.

In one embodiment, the "metal alkyl-containing compound" is selected from the following:

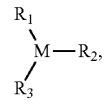

(1)

wherein for Compound 1, M is a Group II or Group III metal, and wherein $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl;

and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 1, M is a Group II or Group III metal, and wherein $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 1, M is a Group II or Group III metal, and wherein, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, for Compound 1, M is a Group III metal, and wherein $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 1, M is a Group III metal, and wherein $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 1, M is a Group III metal, and wherein, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, for Compound 1, M is a Group II metal, and wherein $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 1, M is a Group II metal, and wherein $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 1, M is a Group II metal, and wherein, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

$$\overset{R_1}{\underset{R_3}{\diagdown}}Al\!-\!R_2, \text{ or} \qquad (2)$$

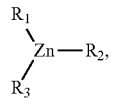

$$\overset{R_1}{\underset{R_3}{\diagdown}}Zn\!-\!R_2, \qquad (3)$$

wherein for each Compound 2 and 3, $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for each Compound 2 and 3, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for each Compound 2 and 3, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

$$\overset{R_1}{\underset{R_3}{\diagdown}}Al\!-\!R_2, \qquad (2)$$

wherein for Compound 2, $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 2, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 2, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

$$\overset{R_1}{\underset{R_3}{\diagdown}}Zn\!-\!R_2, \qquad (3)$$

wherein for Compound 3, $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 3, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 3, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

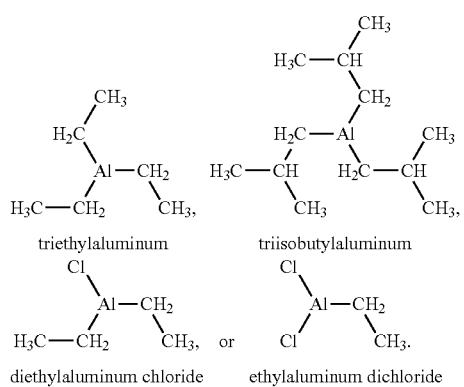

In one embodiment, the "metal alkyl-containing compound" is selected from the following:

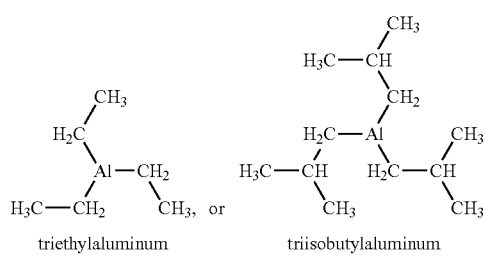

In one embodiment, the "metal alkyl-containing compound" is selected from the following: aluminoxanes or alkyl aluminoxanes. Alkyl aluminoxanes include, but are but not limited to, methylaluminoxanes and isobutylaluminoxanes.

In one embodiment, the "metal alkyl-containing compound" is selected from the following: MMAO (modified methylaluminoxane), MMAO-3A, triethylaluminum, tri-isobutylaluminum, isobutyl aluminoxane, or combinations thereof; or MMAO; or MMAO-3A.

In one embodiment, the "metal alkyl-containing compound" is selected from the following: MMAO, MMAO-3A, or isobutyl aluminoxane, or combinations thereof; or MMAO; or MMAO-3A.

In one embodiment, the "metal alkyl-containing compound" comprises at least one Al-alkyl bond.

In one embodiment, the "metal alkyl-containing compound" is a "Group III metal alkyl-containing compound. In a further embodiment, the metal is aluminum.

In one embodiment, the metal of the "metal alkyl-containing compound" is aluminum.

In one embodiment, the "metal alkyl-containing compound" is present, in the process, in an amount less than, or equal to, 100 mole ppm metal, based on the total moles of ethylene added to the polymerization.

In one embodiment, the "metal alkyl-containing compound" is present, in the process, in an amount from "greater than zero" to less than, or equal to, 100 mole ppm metal, based on the total moles of ethylene added to the polymerization.

In one embodiment, the "metal alkyl-containing compound" is present, in the process, in an amount >0 molar ppm metal, further ≥1 molar ppm metal, and further ≥2 molar ppm metal, based on the total moles of ethylene added to the polymerization. In a further embodiment, the metal is aluminum.

In one embodiment, the "metal alkyl-containing compound" is present, in the process, in an amount >1 molar ppm metal, further ≥3 molar ppm metal, and further ≥5 molar ppm metal, based on the total moles of ethylene added to the polymerization. In a further embodiment, the metal is aluminum.

In one embodiment, the "metal alkyl-containing compound" is present, in the process, in an amount ≤80 molar ppm metal, further ≤70 molar ppm metal, and further ≤60 molar ppm metal, based on the total moles of ethylene added to the polymerization. In a further embodiment, the metal is aluminum.

In one embodiment, the "metal alkyl-containing compound" is present, in the process, in an amount ≤50 molar ppm metal, further ≤40 molar ppm metal, and further ≤30 molar ppm metal, based on the total moles of ethylene added to the polymerization. In a further embodiment, the metal is aluminum.

In one embodiment, the "metal alkyl-containing compound" is present, in the process, in an amount ≤25 molar ppm metal, further ≤20 molar ppm metal, and further ≤15 molar ppm metal, based on the total moles of ethylene added to the polymerization. In a further embodiment, the metal is aluminum.

In one embodiment, the "metal alkyl-containing compound" is present, in the process, in an amount from 1 to 100 molar ppm metal, based on the total moles of ethylene added to the polymerization. In a further embodiment, the metal is aluminum.

In one embodiment, the "metal alkyl-containing compound" is present, in the process, in an amount from 2 to 50 molar ppm metal, based on the total moles of ethylene added to the polymerization. In a further embodiment, the metal is aluminum.

In one embodiment, the "metal alkyl-containing compound" is present, in the process, in an amount from 5 to 20 molar ppm metal, based on the total moles of ethylene added to the polymerization. In a further embodiment, the metal is aluminum.

In one embodiment, the "metal alkyl-containing compound" is i) at least one "Group II metal alkyl-containing compound."

In one embodiment, the "metal alkyl-containing compound" is ii) at least one "Group III metal alkyl-containing compound."

In one embodiment, the "metal alkyl-containing compound" is a combination of i) at least one "Group II metal alkyl-containing compound," and ii) at least one "Group III metal alkyl-containing compound."

An "metal alkyl-containing compound" may comprise any one of the embodiments as described herein.

An "metal alkyl-containing compound" may comprise two or more embodiments as described herein.

Polymerization Process

For producing an inventive ethylene-based polymer, a high pressure, free-radical initiated polymerization process is typically used. Two different high pressure free-radical initiated polymerization process types are known. The first type is an agitated autoclave vessel having one or more reaction zones. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone for either type of reactor is typically defined by the side injection of either initiator of the reaction, ethylene, chain transfer agent, comonomer(s), as well as any combination thereof. A high pressure process can be carried out in autoclave or tubular reactors having one or more reaction zones, or in a combination of autoclave and tubular reactors, each comprising one or more reaction zones.

Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that purified ethylene is required to make the ethylene-based polymer. In such cases ethylene from the recycle loop may be used.

In one embodiment, the ethylene-based polymer is a polyethylene homopolymer.

In another embodiment, the ethylene-based polymer comprises ethylene and one or more comonomers, and preferably one comonomer. Comonomers include, but are not limited to, α-olefin comonomers, typically having no more than 20 carbon atoms. For example, the α-olefin comonomers may have 3 to 10 carbon atoms, or may have 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

Additives

An inventive composition may comprise one or more additives. Additives include, but are not limited to, stabilizers, plasticizers, antistatic agents, pigments and dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes.

Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

Blends and mixtures of the inventive polymer with other polymers may be performed. Suitable polymers for blending with the inventive polymer include natural and synthetic polymers. Exemplary polymers for blending include propylene-based polymers (both impact modifying polypropylene, isotactic polypropylene, atactic polypropylene, and random ethylene/propylene copolymers), various types of ethylene-based polymers, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.)), and can also be useful as components in blends comprising an inventive polymer.

Applications

The polymers and compositions of this invention may be employed in a variety of conventional thermoplastic fabrication processes to produce useful articles, including, but not limited to, monolayer and multilayer films; molded articles, such as blow molded, injection molded, or rotomolded articles; coatings, such as, for example, extrusion coatings; fibers; and woven or non-woven fabrics.

An inventive polymer or composition is also useful in other direct end-use applications. An inventive polymer or composition may be used for wire and cable coating operations, in sheet extrusion for vacuum forming operations, and forming molded articles, including the use of injection molding, blow molding process, and rotomolding processes. An inventive polymer or composition may also be used in medical applications, including those requiring high temperature resistance, such as those requiring autoclaving.

Other suitable applications for the inventive polymers and compositions include, but are not limited to, films, fibers; molded parts, gaskets and profiles; auto interior parts and profiles; foam goods (both open and closed cell); impact modifiers for other thermoplastic polymers, such as high density polyethylene, or other olefin polymers; cap liners; wire and cable coatings, and flooring materials. The inventive polymers or compositions can be used in applications that require polymer modification and/or crosslinking (for example, see EP 2256158A1, EP 2256159A1, and WO 97/45465; each incorporated herein by reference).

Definitions

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

The term "interpolymer," as used herein, refers to polymers prepared by the polymerization of at least two different types of monomers. The generic term interpolymer includes copolymers (employed to refer to polymers prepared from two different monomers), and polymers prepared from more than two different types of monomers.

The term "ethylene-based polymer," as used herein, refers to a polymer that comprises a majority amount of polymerized ethylene monomer (based on weight of the polymer) and, optionally, may comprise at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprises at least one comonomer.

The term "molecular catalyst," as used herein, refers to a catalyst that can be defined by one molecular structure. This term does not include Ziegler-Natta catalysts, which can be defined by more than one molecular structure.

The term "composition," as used herein, includes a mixture of materials which comprise the composition, as well as reaction products and decomposition products formed from the materials of the composition.

The terms "blend" or "polymer blend," as used herein, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods
Conventional GPC Method

For gel permeation chromatography (GPC) measurements, the chromatographic system consisted of a Polymer Laboratories Model PL-220. The column and carousel compartments were operated at 140° C. Three "10-μm Mixed-B columns (Polymer Laboratories, now Agilent)" were used, with a solvent of 1,2,4 trichlorobenzene. The samples were prepared at a concentration of "0.1 g of polymer" in "50 ml of solvent." The solvent used to prepare the samples contained "200 ppm" of the antioxidant butylated hydroxytoluene (BHT). Samples were prepared by agitating lightly for four hours at 150° C. The injection volume was 200 microliters, and the flow rate was 1.0 ml/min. GPC data was collected using a DM 100 data acquisition box (Polymer Char Inc.).

Calibration of the GPC column set was performed with narrow molecular weight distribution polystyrene standards purchased from Polymer Laboratories (Now Agilent). The polystyrene standard peak molecular weights were converted to polyethylene molecular weights using Equation (1), in which M is the molecular weight, A has a value of 0.4316, and B is equal to 1.0. Polyethylene equivalent molecular weight calculations were performed using "GPC One" software from Polymer Char Inc.

$$M\text{polyethylene} = A \times (M\text{polystyrene})^B \quad (1)$$

Conventional GPC Method: Deconvolution Method

Figure 2:
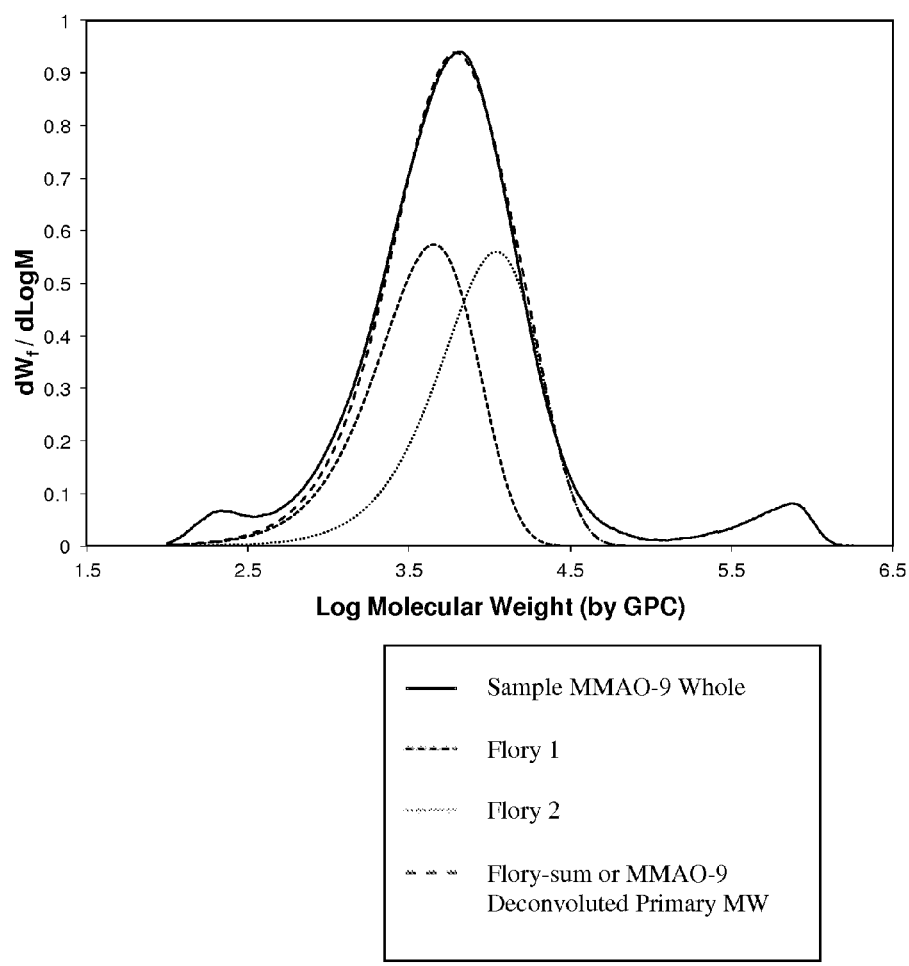
FIG. 2 depicts the GPC curve of comparative example "MMAO-9," along with its deconvolution, in which high and low molecular weight peaks were removed, along with two Flory distributions used to estimate this deconvoluted molecular weight distribution.

A multi-modal GPC curve of comparative example "MMAO-9" is shown in FIG. 2. It is of interest to know the MW and molecular weight distribution (MWD) of the main peak in the center, excluding the minor peak at the very low MW, and the minor peak at the very high MW. By using our deconvolution method, we can successfully isolate the main peak of interest, shown in FIG. 2. The two sub-components that made up this main peak of interest are also shown in FIG. 2.

The quantitative aspect of the deconvolution results are shown in the following Table A.

TABLE A

| | MMAO-9 | | |
|---|---|---|---|
| | Mn (g/mol) | Mw (g/mol) | MWD |
| Original GPC Results | 3,186 | 25,434 | 7.98 |
| Deconvoluted GPC Results | 3,176 | 7,714 | 2.43 |

The Deconvolution Process

The original GPC molecular weight distribution (MWD) of the logarithm of the molecular weight, the molecular weight, and the derivative of the weight fraction with respect to the log of the molecular weight as shown in FIG. 2, are used in the deconvolution of the GPC, to determine the main peak MWD. The original MWD data is fitted by a sum of up to six "Flory most probable MWD functions." A good description of the Flory MWD and MW average calculations can be found in Appendix B of the book "Melt Rheology and its Role in Plastics Processing", by John M. Dealy and Kurt F. Wissbrun, Chapman & Hall publisher, 1996. The Flory molecular weight distribution is defined as follows:

$$w(M) = (M/M_n^2)\exp(-M/M_n), \text{ in which}$$

w(M)=(dW/dM) and, in which, W is the total sample weight when the MWD curve is plotted on a linear MW scale.

In gel permeation chromatography (GPC), the "sample MWD" is plotted on the "$\log_{10}$ MW scale," and the (dW/d $\log_{10}$M) is plotted on the y-axis scale. For example, (dW/d $\log_{10}$ M)=($\log_e$ 10)(dW/d $\log_e$ M)=($\log_e$ 10)(dW/(dM/M))= M($\log_e$ 10)(dW/dM)=M ($\log_e$ 10)w(M) so that (dW/d $\log_{10}$ M)=($\log_e$ 10)($M^2/M_n^2$)exp(-M/$M_n$).

For each molecular weight, M, the sum of the six Flory distribution arrays is weighted by their individual weight fractions. The sum of residue square (SRSQ, or difference between the values of two columns squared), between the sum of the Flory dW/d$\log_{10}$M and the measured dW/d$\log_{10}$M, is calculated. The EXCEL SOLVER MACRO is used to minimize the "SRSQ value," to obtain the deconvolution results, by varying both the weight fraction and the Mn of each of the Flory components. In the "SRSQ column," the start and end row, with their corresponding MW values, are so selected to define the main GPC peak of interest. The "MW averages" are automatically calculated. As shown in FIG. 2, only two Flory distributions were needed to estimate the primary MWD of comparative example "MMAO-69."

1H NMR
Sample Preparation

The samples were prepared by adding approximately "130 mg of sample" to "3.25 g of 50/50, by weight, Tetrachloroethane-d2/Perchloroethylene with 0.001 M Cr(AcAc)3" in a NORELL 1001-7 10 mm NMR tube. The samples were purged by bubbling N2 through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N2 purge box, during storage, before, and after preparation, to minimize exposure to O2. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64s, DI 14s. The double presaturation experiment was run with a modified pulse sequence, TD 32768, 100 scans, DS 4, SWH 10,000 Hz, AQ 1.64s, D1 1s, D13 13s.

Data Analysis—1H NMR Calculations for Vinyls/1000 C

Two experiments were run to obtain spectra, a control spectrum to quantitate the total polymer protons, and a double presaturation experiment, which suppresses the intense polymer backbone peaks, and enables high sensitivity spectra for quantitation of the unsaturation.

The signal from residual 1H in TCE-d2 (at 6.0 ppm) is integrated, and set to a value of 100, and the integral from 3 to −0.5 ppm is used as the signal from the whole polymer in the control experiment. For the presaturation experiment, the TCE signal is also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene are integrated. The integral of the whole polymer from the control experiment is divided by 2 to obtain a value representing X thousands of carbons (i.e., if the polymer integral=28000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives moles unsaturated groups per 1000 moles of carbons.

Density

Samples for density measurements were prepared according to ASTM D 4703-10. Samples were pressed at 374° F. (190° C.) for five minutes at 10,000 psi (68 MPa). The temperature was maintained at 374° F. (190° C.) for the above five minutes, and then the pressure was increased to 30,000 psi (207 MPa) for three minutes. This was followed by one minute hold at 70° F. (21° C.) and 30,000 psi (207 MPa). Measurements were made within one hour of sample pressing, using ASTM D792-08, Method B.

Melt Index

Melt index, MI or I2, was measured in accordance with ASTM D 1238-10, Condition 190° C./2.16 kg, and is reported in grams eluted per 10 minutes. The I10 was measured in accordance with ASTM D 1238, Condition 190° C./10 kg, and was reported in grams eluted per 10 minutes.

EXPERIMENTAL

A) Examples Showing Effect of BHT on Polyethylene Chain Transfer

Blank Polymerizations (1 to 3) (Control)

In a continuous "150 ml" high pressure reactor, ethylene was added at a rate of 69.78 mol/h, and at a reactor pressure of 29,000 psi. The reactor was heated to 230° C. using external electrical heating. A free radical initiator, t-butyl peroxyacetate (TBPA), was added at a rate of 0.088 mmol/hr, to start the production of polyethylene. A sample was collected for evaluation of molecular weight. The reactor was then heated with external heating to 250° C., and a second sample was obtained. Finally the reactor was heated to 280° C., and a third sample obtained. The results of the conversion and polymer molecular weight are shown in Table 1.

Polymerizations with MMAO Only (5-7 and 8-10) (Comparative)

The blank runs were repeated in the exact same manner, as discussed above, except modified methaluminoxane (Akzo Chemical MMAO-3A (in heptane)) was added separately to the reactor at a rate of "3.56 mmol/hr, and 1.78 mmol/hr (see Table 1)." The samples were again collected at 230, 250 and 280° C. As seen in Table 1, the MMAO reduced the conversion and drastically reduced the polymer molecular weight. During these MMAO runs, the reactor temperature was found to be difficult to control, and susceptible to runaway ethylene polymerization reactions.

Polymerizations with "MMAO and BHT" (10-12 and 7-9) (Inventive)

The same MMAO runs were repeated, as discussed above, except the MMAO was first treated by reacting the MMAO with a "1:1 molar equivalent" of 2,6-di tertbutyl phenol-4-methylphenol (BHT) (1:1 equivalent based on Al:BHT). In this case, the samples collected had molecular weights much closer in line to the blank runs, and the reactor operated much more stably. See Table 1. The unsaturation data in Table 2 show, for the polymerization in the presence of MMAO, the level of vinyl termination increases significantly. However, for the polymerization in the presence of both MMAO and BHT, the vinyl levels return to the pre-MMAO levels indicating the MMAO chain transfer mechanism was significantly reduced or eliminated.

B) Examples Showing Effect on Reactor Stability

Blank Polymerization (Control)

In a batch "100 ml" high pressure reactor, ethylene was added to a reactor pressure of 28,000 psi. The reactor was heated to 270° C. using external electrical heating. A free radical initiator, di-tert butyl peroxide, was added to make a peroxide concentration in the reactor of 0.75 mol ppm. Upon adding the peroxide, a polymerization reaction was initiated, resulting in a temperature rise to 293° C. (23° C. temperature rise).

Polymerization with MMAO only (Comparative)

The blank run was repeated in the exact same manner, as discussed above, except modified methaluminoxane (Akzo Chemical MMAO-3A) was added separately to the reactor, to a concentration of 75 mol ppm, prior to adding the peroxide. Upon adding the peroxide the temperature reached 301° C. (31° C. temperature rise).

Polymerization with "MMAO Treated BHT" (Inventive)

The same MMAO polymerization was repeated, as discussed above, except the MMAO was first treated by reacting the MMAO with a "1:0.25 molar equivalent" of 2,6-di tertbutyl phenol-4-methylphenol (BHT) (1:0.25 equivalent based on Al:BHT) in a hydrocarbon solvent (e.g., heptane). In this case, after adding the peroxide, the maximum temperature reached was only 285° C. (15° C. temperature rise). The use of the "BHT treated MMAO" appeared to eliminated completely the extra ethylene conversion caused by the MMAO addition.

TABLE 1

| | TBPA (mmol/hr) | MMAO (mmol/hr) | BHT (mmol/hr) | Reactor T (° C.) | Conversion (%) | Overall GPC | | | Deconvoluted* | | |
|---|---|---|---|---|---|---|---|---|---|---|---|
| | | | | | | Mw (g/mol) | Mn (g/mol) | Mw/Mn | Mw (g/mol) | Mn (g/mol) | Mw/Mn |
| Blank - 1 | 0.088 | 0 | 0 | 230 | 15.8 | 59,522 | 11,113 | 5.36 | 42,060 | 9,868 | 4.26 |
| Blank - 2 | 0.088 | 0 | 0 | 250 | 14.2 | 62,195 | 10,587 | 5.87 | 37,142 | 9,239 | 4.02 |
| Blank - 3 | 0.088 | 0 | 0 | 280 | 12.1 | 40,771 | 7,732 | 5.27 | 26,384 | 7,054 | 3.74 |
| MMAO-5 (Comp) | 0.088 | 3.56 | 0 | 230 | 1.4 | 18,366 | 568 | 32.34 | 1,200 | 484 | 2.48 |
| MMAO-6 (Comp) | 0.088 | 3.56 | 0 | 250 | 2.5 | 26,233 | 584 | 44.90 | 1,929 | 810 | 2.38 |
| MMAO-7 (Comp) | 0.088 | 3.56 | 0 | 280 | 4.2 | 24,240 | 659 | 36.80 | 2,909 | 1,157 | 2.51 |
| MMAO-BHT-10 (Inv) | 0.088 | 3.56 | 3.56 | 230 | 2.8 | 35,089 | 9,930 | 3.53 | 22,562 | 9,319 | 2.42 |
| MMAO-BHT-11 (Inv) | 0.088 | 3.56 | 3.56 | 250 | 3.3 | 42,888 | 9,078 | 4.72 | 20,353 | 8,110 | 2.51 |
| MMAO-BHT-12 (Inv) | 0.088 | 3.56 | 3.56 | 280 | 4.7 | 47,224 | 7,383 | 6.40 | 17,429 | 6,297 | 2.77 |
| MMAO-8 (Comp) | 0.088 | 1.78 | 0 | 230 | 2.3 | 23,687 | 5,399 | 4.39 | 12,123 | 4,921 | 2.46 |
| MMAO-9 (Comp) | 0.088 | 1.78 | 0 | 250 | 2.6 | 32,868 | 2,476 | 13.27 | 7,714 | 3,179 | 2.43 |
| MMAO-10 (Comp) | 0.088 | 1.78 | 0 | 280 | 4.4 | 42,668 | 7,535 | 5.66 | 17,011 | 6,631 | 2.57 |
| MMAO-BHT-7 (Inv) | 0.088 | 1.78 | 1.78 | 230 | 3 | 40,199 | 10,396 | 3.87 | 23,426 | 9,727 | 2.41 |
| MMAO-BHT-8 (Inv) | 0.088 | 1.78 | 1.78 | 250 | 4 | 46,108 | 9,346 | 4.93 | 22,252 | 8,948 | 2.49 |
| MMAO-BHT-9 (Inv) | 0.088 | 1.78 | 1.78 | 280 | 4 | 51,272 | 7,930 | 6.47 | 18,674 | 6,611 | 2.82 |

*Deconvoluted, excluding high molecular weight peak and in some cases low molecular weight peak.
(Inv) = Inventive polymerization;
(Comp) = Comparative polymerization

TABLE 2

1H NMR Unsaturation Data.

| | vinyl/1000 C |
|---|---|
| Blank - 1 | 0.07 |
| Blank - 2 | 0.05 |
| Blank - 3 | 0.11 |
| MMAO-5 (Comparative) | 11.91 |
| MMAO-6 (Comparative) | 11.7 |
| MMAO-7 (Comparative) | 8.34 |
| MMAO-BHT-10 (Inventive) | 0.022 |
| MMAO-BHT-11 (Inventive) | 0.030 |
| MMAO-BHT-12 (Inventive) | 0.041 |
| MMAO-8 (Comparative) | 1.85 |
| MMAO-9 (Comparative) | 3.22 |
| MMAO-10 (Comparative) | 1.35 |
| MMAO-BHT-7 (Inventive) | 0.015 |
| MMAO-BHT-8 (Inventive) | 0.019 |
| MMAO-BHT-9 (Inventive) | 0.034 |

The invention claimed is:

1. A process to form an ethylene-based polymer, said process comprising polymerizing ethylene in presence of at least the following:
   A) a free-radical agent;
   B) an alkylated phenol selected from Formula I:

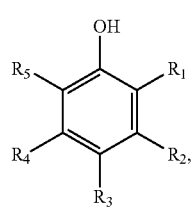

(Formula I)

wherein R1, R2, R3, R4 and R5 are each, independently, hydrogen or an alkyl; and C) a "metal alkyl-containing compound" selected from the group consisting of the following:
   i) at least one "Group II metal alkyl-containing compound," and wherein the metal is zinc,
   ii) at least one "Group III metal alkyl-containing compound," and wherein the metal is aluminum, and
   iii) a combination of i) and ii).

2. The process of claim 1, wherein the alkylated phenol is present in an amount greater than, or equal to, 2 molar ppm, based on the total moles of ethylene added to the polymerization.

3. The process of claim 1, wherein the alkylated phenol is present in an amount greater than, or equal to, 5 molar ppm, based on the total moles of ethylene added to the polymerization.

4. The process of claim 1, wherein the "metal alkyl-containing compound" comprises at least one Al-alkyl bond.

5. The process of claim 1, wherein the "metal alkyl-containing compound" is a "Group III metal alkyl-containing compound".

6. The process of claim 1, wherein the metal of the "metal alkyl-containing compound" is aluminum.

7. The process of claim 1, wherein the free-radical agent is a peroxide.

8. The process of claim 1, wherein the polymerization temperature is from 140° C. to 350° C.

9. The process of claim 1, wherein the polymerization takes place at a polymerization pressure of at least 14,000 psi.

10. The process of claim 1, wherein the ethylene-based polymer is a LDPE homopolymer.

11. A process for polymerizing an ethylene-based polymer composition, said process comprising at least the following steps:
   1) polymerizing ethylene in the presence of at least one molecular catalyst, a hydrocarbon chain transfer agent, and a "metal alkyl-containing compound" selected from the group consisting of the following:
   i) at least one "Group II metal alkyl-containing compound," and wherein the metal is zinc,
   ii) at least one "Group III metal alkyl-containing compound," and wherein the metal is aluminum, and
   iii) a combination of i) and ii),
   and at a polymerization pressure of at least 14,000 psi, to form a first ethylene-based polymer; and 2) polymerizing a second ethylene-based polymer according to the process of claim 1.

12. The process of claim 11, wherein the first ethylene-based polymer is polymerized in the presence an alkylated phenol selected from Formula I.

13. A composition comprising the ethylene-based polymer formed by the process of claim 1.

14. A composition comprising the ethylene-based polymer composition formed by the process of claim 11.

15. An article comprising at least one component formed from the composition of claim 13.

16. An article comprising at least one component formed from the composition of claim 14.

* * * * *